Aug. 26, 1958   M. COHEN ET AL   2,849,012
VEHICLE COVER
Filed July 12, 1955   2 Sheets-Sheet 1
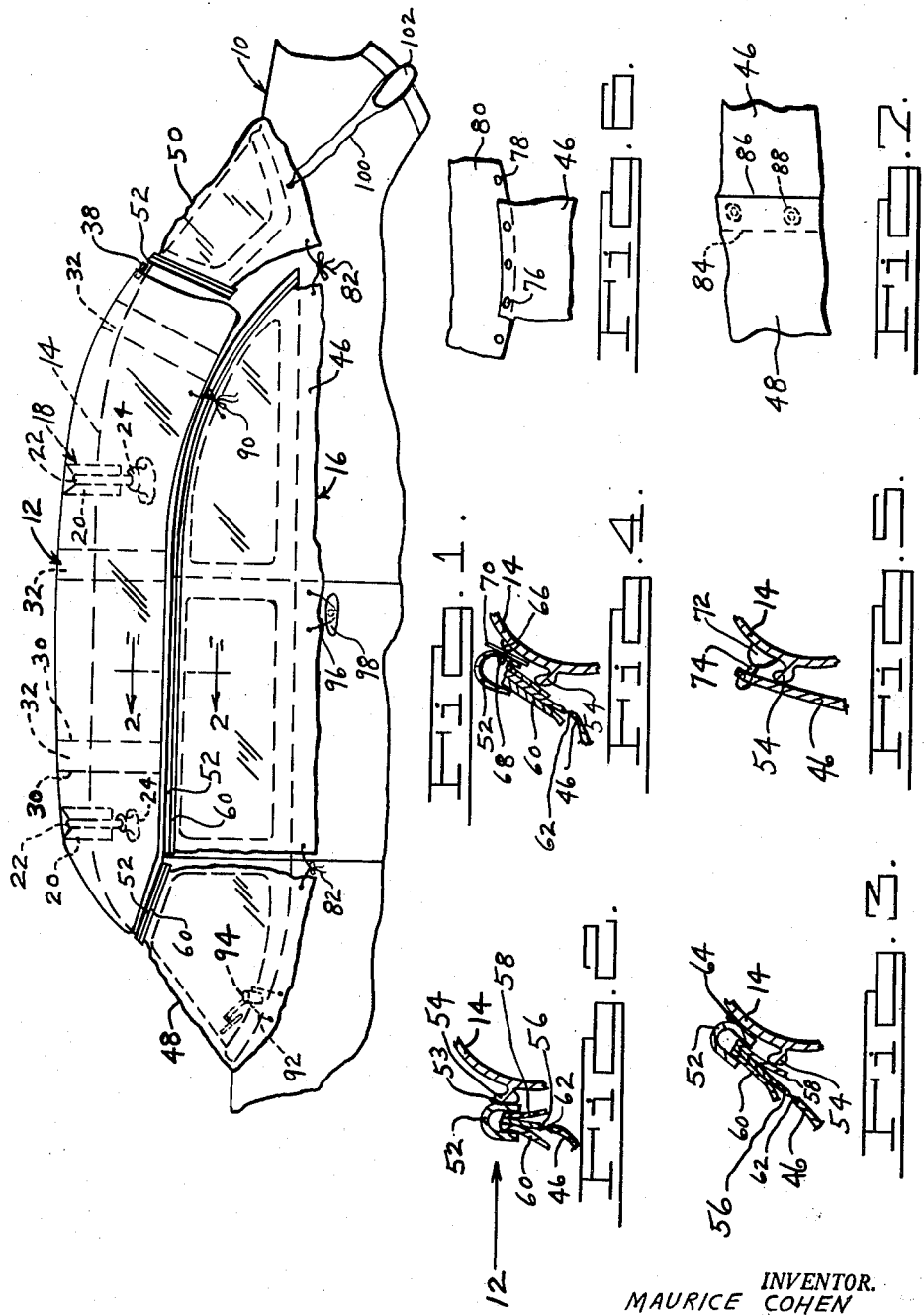
INVENTOR.
MAURICE COHEN
JEAN KARSON
BY
Robert G. Mentag
ATTORNEY

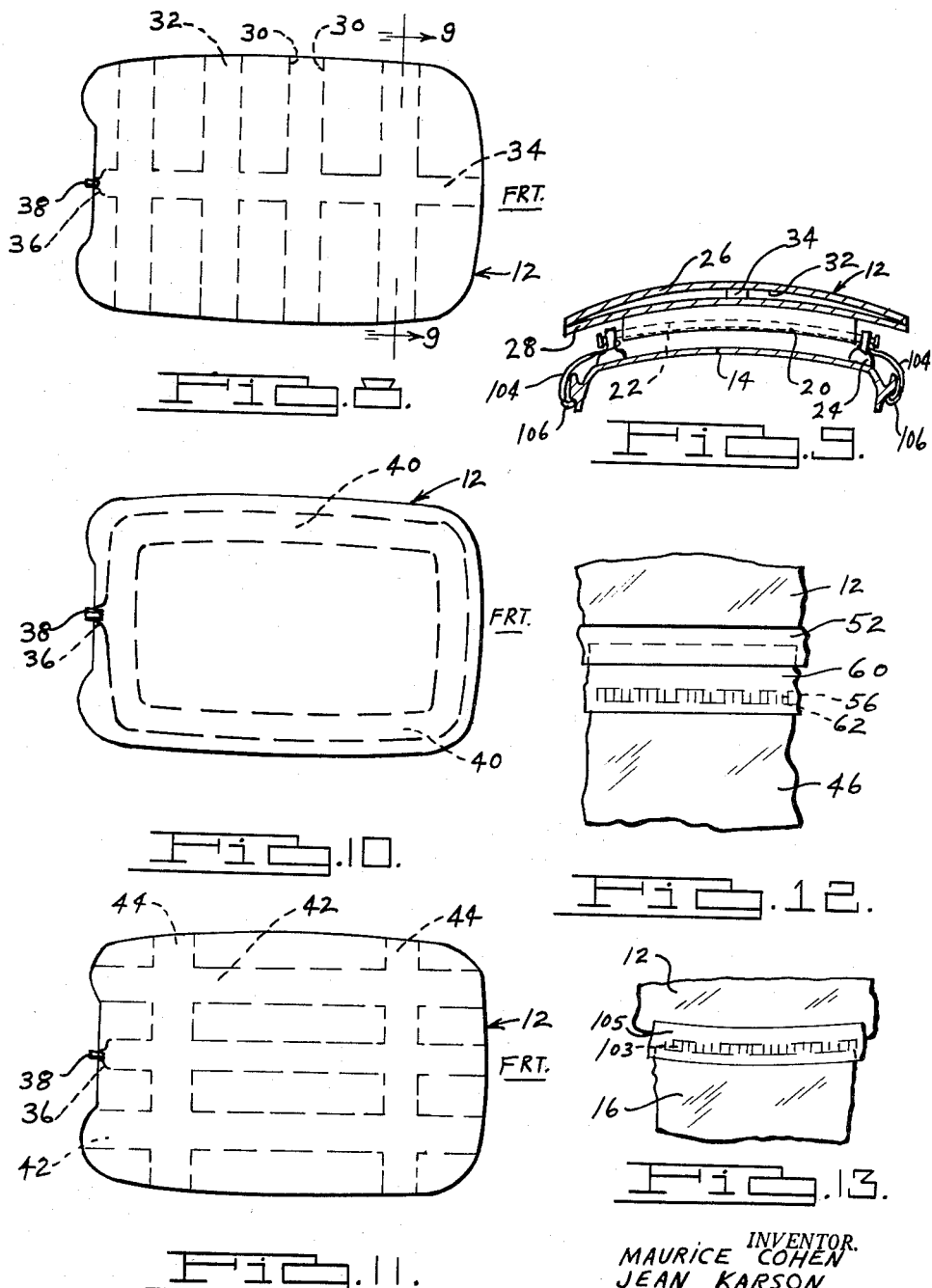

United States Patent Office 2,849,012
Patented Aug. 26, 1958

2,849,012

VEHICLE COVER

Maurice Cohen and Jean Karson, Detroit, Mich.

Application July 12, 1955, Serial No. 521,458

7 Claims. (Cl. 135—5)

This invention relates to a vehicle cover especially adapted to enclose and protect the top and/or window areas of a vehicle from the adverse effect of the elements, such as snow, sleet, rain and the sun.

It is an important object of this invention to provide a vehicle cover of the class described above, which may be quickly and easily mounted on and removed from the vehicle.

It is another object of this invention to provide a vehicle cover comprising, a first part which is adapted to be detachably mounted on the top of a vehicle, when the vehicle is either parked or moving and which is provided with a fluid storage means for storing a fluid adapted to provide a cooling effect on the top of the vehicle; a second part which is adapted to be detachably connected to the front, rear and side areas of the vehicle for covering the window areas of the vehicle; said second part including a plurality of separate portions; and, said first and second parts being adapted for combined or separate use.

It is still another object of this invention to provide a multi-part cover for the window areas of a vehicle, and which may be easily and quickly attached to the vehicle.

It is a further object of this invention to provide a cover for the top of the passenger compartment of a vehicle which is provided with means for storing water, whereby an insulating layer of water may be carried in said cover to provide a cooling effect on the top of the vehicle, and, a suitable water storage means is provided for trips through hot climates.

It is a still further object of this invention to provide a vehicle cover of the above described class which may be made from any suitable flexible, light-weight material such as plastic, canvas, metal, and the like, which may be shaped according to the particular vehicle on which it is to be applied, and, which may be transparent or opaque, as desired.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a fragmentary side elevational view of a vehicle provided with a cover made in accordance with the principles of the invention;

Fig. 2 is an enlarged fragmentary elevational sectional view of the structure illustrated in Fig. 1, taken along the line 2—2 thereof;

Fig. 3 is a view similar to Fig. 2, showing a modification of the invention;

Fig. 4 is a view similar to Fig. 2, showing another modification of the invention;

Fig. 5 is a view similar to Fig. 2, showing a further modification of the invention;

Fig. 6 is an enlarged fragmentary elevational view of a still further modification of the invention, showing an adaption of the cover for use on a convertible;

Fig. 7 is an enlarged fragmentary elevational view, which illustrates another method of connecting the cover parts together;

Fig. 8 is a top plan view of one embodiment of the upper part of the vehicle cover;

Fig. 9 is an elevational sectional view of the structure illustrated in Fig. 8, taken along the line 8—8 thereof;

Fig. 10 is a top plan view of a second embodiment of the upper part of the vehicle cover;

Fig. 11 is a top plan view of a third embodiment of the upper part of the vehicle cover;

Fig. 12 is an enlarged fragmentary side elevational view of the structure shown in Fig. 2, taken in the direction of arrow 12; and, Fig. 13 is an enlarged fragmentary elevational view showing the cover parts connected by a zipper means.

Before explaining in detail the present invention, it is to be uderstood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

In the drawings, the numeral 10 designates a vehicle provided with a protective cover made in accordance with the principles of the invention. The vehicle cover comprises an upper part 12, which is adapted to be detachably anchored to the top 14 of the vehicle 10, and a lower part 16 which is adapted to be detachably connected to the vehicle 10 at a point immediately above the top of the vehicle windows.

The upper part 12 of the vehicle cover is formed with a convex cross section, both longitudinally and transversely, so as to extend over the top of a vehicle and downwardly to approximately the upper level of the vehicle windows. Both the upper part 12 and the lower part 16 are adapted to be made from any suitable flexible, light-weight material, such as plastic, canvas, and the like, and, said material may be colored, transparent or opaque.

The upper part 12 of the vehicle cover is adapted to be releasably attached or anchored to the top of a vehicle by any suitable means, but it has been found preferable to use two or more of the retaining structures generally indicated by the numeral 18. The retaining or anchoring structures 18 each comprise a transversely disposed sleeve 20 which is fixedly mounted on the inner side of the cover upper part 12 by any suitable means, as by stitches. The sleeve 20 carries a transverse rod 22 which is fixed in place in said sleeve by any suitable means. The transverse rod 22 is provided on each end thereof with a rubber suction cup 24 which is adapted to releasably engage the top 14 of a vehicle. The upper part 12 of the cover may thus be easily and quickly attached to the top of a vehicle, by means of the aforegoing described suction cup retaining structures, and in a spaced relation with the top of a vehicle.

As shown in Figs. 8 and 9, the cover upper part 12 is preferably formed with an upper and lower portion 26 and 28, respectively, having the edges 30 thereof suitably connected, as by stitches. The cover portions 26 and 28 may be stitched together along a plurality of transverse positions 30 so as to form transverse pockets 32. The transverse pockets 32 may be interconnected by one or more similarly formed longitudinal pockets, as 34, which is provided with an outlet 36. The outlet 36 may be closed by any suitable means, as by the plug 38, which may be threaded or press fitted in the outlet 36. The pockets 32 and 34 may be filled with water, whereby an insulating layer of water may be carried over the top of a vehicle when driving or parking in hot climates. The pockets 32 and 34 may be spaced apart or be made in side by side positions, as desired, and said pockets may serve as an extra storage facility for drinking water when passing through hot climates.

As shown in Fig. 10, the cover upper part 12 may be provided with one or more circular water storage pockets or channels 40, instead of a plurality of transverse pockets. Fig. 11 shows a further modification of the cover upper part 12 in which the water pockets 42 are longitudinally disposed and interconnected by one or more transverse pockets 44.

The cover lower part 16 comprises a pair of side portions as 46, a front portion 48, and a rear portion 50, which are adapted to be releasably attached to a vehicle immediately above the window areas and adjacent the outer edge of the cover upper part 12. A preferable means for releasably attaching the cover portions 46, 48 and 50 to a vehicle comprises the use of a light-weight metal channel 52 which is permanently fixed to the vehicle top, by any suitable means, as by welding indicated at 53. Along the sides of the vehicle, the channel 52 may be welded to the outer sides of the rain gutters 54, as shown in Fig. 2.

The U-shaped channel 52, shaped in accordance with the curvatures of the windows, is adapted to hold, in a downwardly extending position, one part 56 of a suitable zipper, and, inner and outer protective flaps 58 and 60, respectively. The cover lower portions, as 46, are each provided with a zipper part 62 which is adapted to be detachably connected to the zipper part 56 in the usual manner.

As shown in Fig. 3, the U-shaped channel 52 may be suitably fixed to the sides of a vehicle at a point above the rain gutters, as by welding indicated at 64. The front and rear cover portions 48 and 50 would be attached in this manner since no rain gutters are provided on a vehicle in these areas.

Fig. 4 shows a further modification of the invention in which the U-shaped channel 52 is provided with rubber suction cups 66 having arms 68 suitably fixed to said channel. The suction cups 66 are adapted to be detachably mounted on a vehicle over the window areas. A rubber backing strip 70 may be provided on the inner surface of the channel 52 to prevent scratching or marring of the vehicle surface.

Fig. 5 shows a further modification of the invention in which the cover portions 46, 48 and 50 may be provided with suitable suction cups 72 directly connected to the top of said portions by the arm 74. In this modification the zipper parts 56 and 62 are not needed.

As illustrated in Fig. 6, the cover lower part 16 may be adapted for use on a convertible by providing the portions 46, 48 and 50 with suitable snaps 76 which are adapted to be releasably attached to the mating snaps 78, which are normally found on all conventional convertible tops 80.

As shown in Fig. 1, the adjacent edges of the cover portions 46, 48 and 50 may be secured together by tie strings as 82. Fig. 7 illustrates a further means for overlapping the adjacent edges 84 and 86 of the cover portions 46, 48 and 50, and securing them in place by suitable snap means 88.

If desired, the cover upper part 12 may be attached to the lower portions 46, 48 and 50 by any suitable means, as by the tie strings 90. The cover front portion 48 may be provided with tie down strings 92 for attachment around the windshield wipers 94. The cover side portions 46 may be provided with tie down strings 96 for attachment around the handles 98. The cover rear portions 50 may be provided with tie down strings 100 for attachment to the bumper parts 102 of the vehicle on which the cover is mounted.

In use, the cover upper part 12 may be used with the cover lower part 16, or the two parts may be used separately, as desired. The novel vehicle cover may be used to protect a vehicle from the adverse effects of the elements or the lower part may be used to provide privacy to the occupants of the vehicle, as for sleeping purposes when camping, changing bathing suits, and the like. It will be understood, that the lower part 16 may be made in one continuous wrap-around piece, if desired, and be detachably connected to the cover upper part 12, by any suitable means, as by the use of snaps or zippers. Fig. 13 shows how a zipper 103 may be used to detachably connect a one-piece lower part 16 to the upper part 12. My copending application, Serial No. 515,318, filed on June 14, 1955, illustrates in detail the manner in which a zipper and/or snap means may be used for attaching the cover lower part 16 to the cover upper part 12, when said lower part is made in a one-piece member. Numeral 105 indicates a protective flap.

It will be seen, that the present invention provides a vehicle cover comprising an upper and a lower part which may be used in combination or separately. If the upper part 12 is used while the vehicle is moving, so as to get the benefit of the fluid insulated top, the retaining means 18 may be provided with hold down wires 104, or the like, to provide extra holding strength to permit the vehicle to attain higher speeds. The wires 104 would be provided with hooks as 106, on the outer ends thereof, for detachably engaging the rain gutter 54, or the like, on a vehicle, and this is shown in Fig. 9.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A vehicle cover of the class described, for use on vehicles having a roofed passenger compartment provided with window areas comprising: a first part adapted to cover the roof of a vehicle and being shaped in accordance therewith; retaining means for detachably anchoring said first part of the vehicle roof in a spaced relationship therewith; said first part being provided with a plurality of fluid storage pockets therein; a second part adapted to cover the window areas of the vehicle and being shaped in accordance therewith; and, fastening means for detachably fastening said second part to the vehicle.

2. The invention as set forth in claim 1, wherein: said fastening means for detachably fastening said second part to the vehicle comprises a plurality of suction cups fixed on the upper edge of said second part and adapted to detachably engage the vehicle.

3. The invention as set forth in claim 1, wherein: said fastening means for detachably fastening said second part to the vehicle comprises a downwardly facing U-shaped channel which is adapted to be fastened to the vehicle and which is provided with a zipper means for releasably holding the second part.

4. The invention as set forth in claim 3, wherein: said U-shaped channel is fixed to the vehicle by welding or the like.

5. The invention as set forth in claim 3, wherein: said U-shaped channel is fixed to the vehicle, by welding or the like, on the outer side of the rain gutter on the vehicle.

6. The invention as set forth in claim 3, wherein: said U-shaped channel is fixed to the vehicle by suction cups.

7. A vehicle cover of the class described, for use on vehicles having a roofed passenger compartment provided with window areas comprising: a first part shaped to cover the roof of the passenger compartment of a vehicle; said first part being provided with a plurality of fluid storage pockets therein; retaining means for detachably anchoring said first part of the vehicle roof in a spaced apart relationship therewith; a second part formed to cover the window areas of the vehicle; and, fastening means for detachably fastening said second part to said first part.

References Cited in the file of this patent

UNITED STATES PATENTS

| | | | |
|---|---|---|---|
| 1,472,651 | Holling | Oct. 30, | 1923 |
| 1,579,560 | Moore | Apr. 6, | 1926 |
| 1,679,886 | Wright | Aug. 7, | 1928 |
| 2,135,419 | Wesseler | Nov. 1, | 1938 |
| 2,248,655 | Bila | July 8, | 1941 |
| 2,279,812 | Bartlett | Apr. 14, | 1942 |
| 2,423,402 | Olsen | July 1, | 1947 |
| 2,552,819 | Schwarzmayr | May 15, | 1951 |
| 2,609,042 | Chamberlain | Sept. 2, | 1952 |
| 2,666,840 | Poirier | Jan. 19, | 1954 |